US012114175B2

(12) United States Patent
Khomenko et al.

(10) Patent No.: US 12,114,175 B2
(45) Date of Patent: Oct. 8, 2024

(54) INTELLIGENT WIRELESS NETWORK DESIGN SYSTEM

(71) Applicant: ITRA Wireless Ai, LLC, New York, NY (US)

(72) Inventors: Andriy Khomenko, New York, NY (US); Maxim Kormilitsin, Dallas, TX (US)

(73) Assignee: ITRA Wireless AI, LLC, New York, NY (US)

( * ) Notice: Subject to any disclaimer, the term of this patent is extended or adjusted under 35 U.S.C. 154(b) by 351 days.

(21) Appl. No.: 17/566,612

(22) Filed: Dec. 30, 2021

(65) Prior Publication Data

US 2023/0217260 A1 Jul. 6, 2023

(51) Int. Cl.
| | |
|---|---|
| *H04L 41/16* | (2022.01) |
| *B64C 39/02* | (2023.01) |
| *H04B 17/391* | (2015.01) |
| *H04W 16/18* | (2009.01) |
| *B64U 101/30* | (2023.01) |

(52) U.S. Cl.
CPC ........... *H04W 16/18* (2013.01); *B64C 39/024* (2013.01); *H04B 17/3913* (2015.01); *H04L 41/16* (2013.01); *B64U 2101/30* (2023.01)

(58) Field of Classification Search
CPC .................................................... H04W 16/18
See application file for complete search history.

(56) References Cited

U.S. PATENT DOCUMENTS

| | | |
|---|---|---|
| 8,229,416 B2 | 7/2012 | Akman et al. |
| 8,812,273 B2 | 8/2014 | Trabona |
| 8,953,933 B2 | 2/2015 | Ohtomo et al. |

(Continued)

FOREIGN PATENT DOCUMENTS

| | | |
|---|---|---|
| CN | 102523590 B | 7/2014 |
| CN | 109688597 A | 4/2019 |

(Continued)

OTHER PUBLICATIONS

International Search Report and Written Opinion mailed Mar. 31, 2023 cited in Application No. PCT/US22/81660, 22 pgs.

*Primary Examiner* — Michael T Vu
(74) *Attorney, Agent, or Firm* — Morris, Manning & Martin, LLP; Daniel E. Sineway, Esq.; Daniel T. Begasse, Esq.

(57) ABSTRACT

A system for an automated ML-based design of a wireless network. The system includes a processor of a design server node connected to at least one local, edge, or cloud server node over a network and a memory on which are stored machine-readable instructions that when executed by the processor, cause the processor to: acquire aerial 3-D mapping data of a target area from an unmanned aircraft system (UAS) flying over the target area; acquire surface 3-D mapping data from a ground robotic crawler; parse the 3-D mapping data to derive an at least one feature vector; provide the at least one feature vector to a machine learning (ML) module residing on the at least one local, edge, or cloud server node for generating a predictive model of a wireless network for some or all of the target area; receive outputs of the predictive model; and generate a wireless network design for the some or all of the target area based on the predictive outputs.

18 Claims, 7 Drawing Sheets

(56) References Cited

U.S. PATENT DOCUMENTS

| | | |
|---|---|---|
| 2010/0056163 A1 | 3/2010 | Schmidt et al. |
| 2018/0310187 A1 | 10/2018 | Ross |
| 2019/0146477 A1 | 5/2019 | Cella et al. |
| 2020/0136949 A1 | 4/2020 | Pant et al. |
| 2022/0375356 A1* | 11/2022 | Bateman .............. G08G 5/0091 |
| 2022/0398806 A1* | 12/2022 | Arksey ................ H04W 28/24 |

FOREIGN PATENT DOCUMENTS

| | | |
|---|---|---|
| CN | 110636515 A | 12/2019 |
| DE | 10251993 A1 | 5/2004 |
| DE | 60318638 T2 | 12/2008 |
| JP | 3280025 B2 | 4/2002 |
| JP | 4719753 B2 | 7/2011 |
| WO | 2004025978 A1 | 3/2004 |
| WO | 2020123208 A1 | 6/2020 |

\* cited by examiner

300

302
Acquire aerial surveillance data of a target area from an unmanned aircraft system (UAS) flying over the target area 304
Parse the aerial surveillance data to derive an at least one feature vector 306
Provide the at least one feature vector to a machine learning (ML) module residing on the at least one cloud server node for generating a predictive model of a wireless network for the target area 308
Receive outputs of the predictive model and generate a wireless network design for the target area based on the predictive outputs

*FIG. 3A*

INTELLIGENT WIRELESS NETWORK DESIGN SYSTEM

FIELD OF DISCLOSURE

The present disclosure generally relates to designing wireless networks, and more particularly, to an intelligent machine learning (ML)-based automated system for wireless network design and optimization.

BACKGROUND

Wireless network systems are conventionally implemented based on design specification, area, equipment requirements, budgets, etc.

The process of network implementation and tower site selection is of a concern of property owners worldwide. Securing tower locations is the result of a network designers working with their internal engineering staff to satisfy specific needs that company has in certain locations throughout the area. The engineering aspect is referred to as "Radio Frequency Engineering" or RF Engineering, for short. The RF engineers must act in concert with the site development and construction staff to optimize any cell tower site development and related construction projects that may have been scheduled.

A goal of a conventional wireless network design is to provide:
  Signal Strength/Coverage: Cell towers are built to eliminate those locations where the services may be lacking, known as the "Dead Spot." Typically, the RF Engineers determine where there are high rates of service interruption due to either interference or signal issues, then, a new cell tower site is selected and developed to eliminate these dead areas.
  Data Usage Capacity: With the high demand for wireless connectivity to multiple devices and the data usage required for these devices, there must be an adequate amount of cell towers to facilitate such demand. The main reasons new tower locations are being selected and constructed are to meet these growing data usage needs and technological advancements.
  Call Clarity and Network Speed: The telecom industry is a complex industry but like most, it relies on increasing its customer base and satisfying the needs of its existing customers. Therefore, network must be designed and constructed to make sure customer needs are met.

Additionally, the network design must meet needs and restrictions as it relates to the ground space requirements for the selection, development and construction of new towers. The primary focus of companies is leasing ground space in both urban and rural areas for locations that have at least 1,500 square feet of ground space.

While the companies are always surveying the areas to make sure they are meeting the needs warranting faster, broader networks and the towers that can facilitate service for these networks, the network design process remains manual or semi-manual relying on static data and intuition of the RF engineers. This prevents the implementation of the most optimal network design. Furthermore, this approach also remains predominantly two-dimensional, with the intended area of coverage mostly being the surface area just above ground or floor of a building. The current networks may include a plethora of IoT devices on the ground, just above the surface, and in the air. The conventional manual approach is increasingly difficult to apply and scale for these networks.

Accordingly, a system and method for intelligent machine learning (ML)-based automated network design and optimization are desired.

BRIEF OVERVIEW

This brief overview is provided to introduce a selection of concepts in a simplified form that are further described below in the Detailed Description. This brief overview is not intended to identify key features or essential features of the claimed subject matter. Nor is this brief overview intended to be used to limit the claimed subject matter's scope.

One embodiment of the present disclosure provides a system for an automated ML-based design of a wireless network. The system includes a processor of a design server node run locally, on the edge, or connected to at least one cloud server node over a network and a memory on which are stored machine-readable instructions that when executed by the processor, cause the processor to: acquire aerial surveillance data of a target area from an unmanned aircraft system (UAS) flying over the target area; parse the aerial surveillance data to derive an at least one feature vector; provide the at least one feature vector to a machine learning (ML) module residing on the at least one cloud server node for generating a predictive model of a wireless network for the target area; receive outputs of the predictive model; and generate a wireless network design for the target area based on the predictive outputs. The system includes a processor of a design server node run locally, on the edge, or connected to at least one cloud server node over a network and a memory on which are stored machine-readable instructions that when executed by the processor, cause the processor to: acquire 3D mapping data of some or all of the target area from a sensor system mounted on an unmanned aircraft system (UAS) flying over and/or a robotic ground crawler moving on the surface of the target area; parse the 3-D mapping data to prepare it for being a direct or an indirect input into a signal quality ML model; run at least one or a plethora instances of a signal quality ML model or models running locally, on the edge, or residing on the at least one cloud server node, based on at least one combination of target area points and network configuration parameters; receive outputs of the predictive model; compare the outputs of the signal quality ML model(s) and select those that meet selection criteria; present the selected network designs to a user for a final decision.

Another embodiment of the present disclosure provides a method that includes one or more of: acquiring aerial surveillance 3-D mapping data of a target area from an unmanned aircraft system (UAS) flying over some or all of the target area; acquiring 3-D mapping data from a ground robotic system crawling over some or all of the target area; parsing the aerial surveillance 3-D mapping data and the ground survey 3-D mapping data to derive an at least one feature vector; providing the at least one feature vector to a machine learning (ML) module residing on the at least one cloud server node for generating a predictive model of a wireless network for the target area; receiving a plurality of outputs of the predictive model; and generating a wireless network design for the target area based on the plurality of the predictive outputs.

Another embodiment of the present disclosure provides a computer-readable medium including instructions for acquiring aerial surveillance 3-D mapping data of a target area from an unmanned aircraft system (UAS) flying over some or all of the target area or for acquiring 3-D mapping data from a ground robot crawling over some or all of the target area; parsing the 3-D mapping data to derive an at least one feature vector; providing the at least one feature vector to a machine learning (ML) module running locally, on the edge, or residing on the at least one cloud server node for generating a predictive model of a wireless network for the target area; receiving a plurality of outputs of the predictive model; and generating a wireless network design for the target area based on the plurality of the predictive outputs.

Both the foregoing brief overview and the following detailed description provide examples and are explanatory only. Accordingly, the foregoing brief overview and the following detailed description should not be considered to be restrictive. Further, features or variations may be provided in addition to those set forth herein. For example, embodiments may be directed to various feature combinations and sub-combinations described in the detailed description.

BRIEF DESCRIPTION OF THE DRAWINGS

The accompanying drawings, which are incorporated in and constitute a part of this disclosure, illustrate various embodiments of the present disclosure. The drawings contain representations of various trademarks and copyrights owned by the Applicant. In addition, the drawings may contain other marks owned by third parties and are being used for illustrative purposes only. All rights to various trademarks and copyrights represented herein, except those belonging to their respective owners, are vested in and the property of the Applicant. The Applicant retains and reserves all rights in its trademarks and copyrights included herein, and grants permission to reproduce the material only in connection with reproduction of the granted patent and for no other purpose.

Furthermore, the drawings may contain text or captions that may explain certain embodiments of the present disclosure. This text is included for illustrative, non-limiting, explanatory purposes of certain embodiments detailed in the present disclosure. In the drawings:

FIG. 3A illustrates a flowchart of a method for ML-based network design and optimization of the design processing consistent with the present disclosure;

DETAILED DESCRIPTION

Figure 1A:
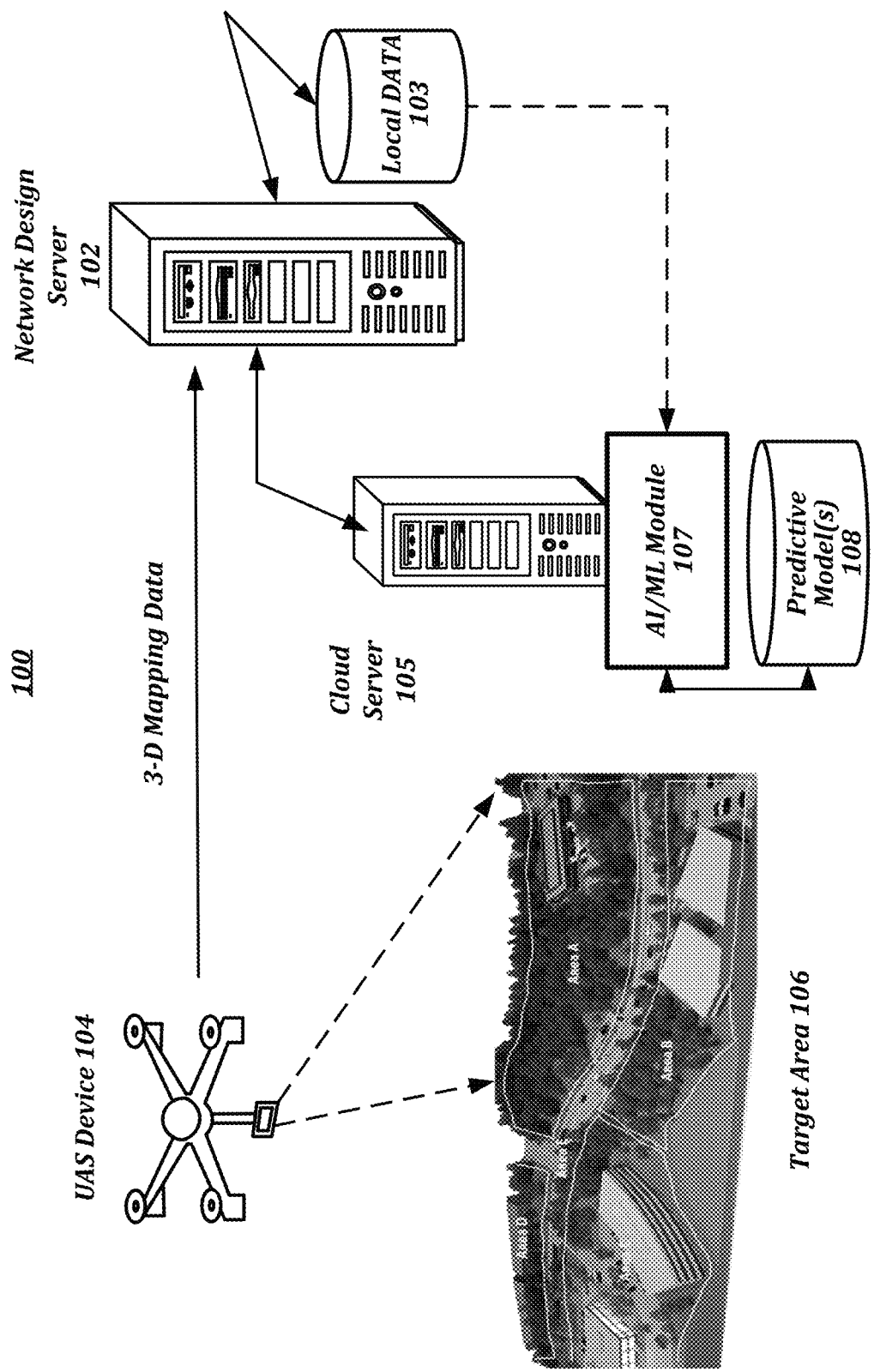
FIG. 1A illustrates a network diagram of a system for ML-based network design process employing 3-D mapping data consistent with the present disclosure.

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present invention. Accordingly, it is intended that the scope of patent protection is to be defined by the issued claim(s) rather than the description set forth herein.

Additionally, it is important to note that each term used herein refers to that which an ordinary artisan would understand such term to mean based on the contextual use of such term herein. To the extent that the meaning of a term used herein—as understood by the ordinary artisan based on the contextual use of such term—differs in any way from any particular dictionary definition of such term, it is intended that the meaning of the term as understood by the ordinary artisan should prevail.

Regarding applicability of 35 U.S.C. § 112, ¶6, no claim element is intended to be read in accordance with this statutory provision unless the explicit phrase "means for" or "step for" is actually used in such claim element, whereupon this statutory provision is intended to apply in the interpretation of such claim element.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list."

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims. The present disclosure contains headers. It should be understood that these headers are used as references and are not to be construed as limiting upon the subjected matter disclosed under the header.

The present disclosure includes many aspects and features. Moreover, while many aspects and features relate to, and are described in, the context of processing job applicants, embodiments of the present disclosure are not limited to use only in this context.

The present disclosure provides a system, method and computer-readable medium for an intelligent ML-based automated network design and optimization.

In one embodiment of the present disclosure, the system provides for AI/ML-generated RF design options based on 3-D signal quality pattern analysis and predictions for the 3-D area map including its surface and 3-D volume above it to a target height. An automated decision model may be configured to provide for identification of the most effective backhaul type, vendor in each type, and location of the gateway module in 3-D space (accounting for downstream area network signal strength and total area network cost of service optimization problem discussed below). In one embodiment, a signal quality may be analyzed. The signal quality data may include signal strength, latency and packet loss measured in a specific unit of 3-D space overlaid with simultaneous measurements of the density of user devices in that unit of 3-D space.

In one embodiment of the present disclosure, an unmanned aircraft system UAS (such as a drone) equipped with signal measurement devices flies over a target network area intended for a network design. The UAS produces 3-D signal quality pattern data that may be provided to a design server for analysis. In one embodiment of the present disclosure, the design server may provide for discovery and calculation of the optimal location(s) of the backhaul gateway(s) using measurements taken and solving proprietary algorithm (e.g., interpolation) to discover good 3-D location candidates (e.g., latitude/longitude/height/orientation) with respect to signal strength and other parameters. The design server may perform a simultaneous assessment of trade-offs of "anchor tower" location(s) vs overall area network design. The design server may, advantageously, provide data related to implications of a total cost of ownership as well as decisioning and recommendation of top transport type, vendor, gateway model, gateway location combinations, etc.

Network design automation in accordance to the embodiments of the present disclosure may include 3-D surveillance of a target coverage area and surfaces using surveillance data produced by the UAS flying over the target area. The 3-D surveillance data may include but is not limited to photogrammetry data, Light Detection and Ranging (LiDAR) data, thermal imagery data. The 3-D surveillance data may include overlaying of third-party satellite data (if available). Analysis of the 3-D surveillance data may include a derivation of the 3D point cloud with specificity about interference ground object types (e.g., vegetation, buildings, terrain, water volumes, surface objects types—i.e., brick buildings vs glass or steel, etc.).

The network design server may perform identification of feasible tower deployment spots based on surface materials, inclination, solar coverage, construction reach, and other parameters. In one embodiment of the present disclosure, the design server may implement a signal strength modeling based on proprietary signal propagation models in 3-D space including detection of objects and/or their surface classes that can have an effect on signal propagation (e.g., signal blocking, refraction, or absorption). As discussed above, overall signal quality data including signal strength, latency and packet loss measured in a specific unit of 3-D space overlaid with simultaneous measurements of the density of user devices in that unit of 3-D space may be used.

The network design server may use visual surface characteristics and LiDAR point cloud characteristics provided by an AI/ML module. The design server may optionally rely on direct sourcing from source data (defined relying on third-party LiDAR post-processing applications). In one embodiment of the present disclosure, the network design server may be implemented on a local server, a cloud server, an edge server or a combination thereof. The network design server may be connected to or may host an AI/ML module. The network design server may collect 3-D space map(s) data and 3-D signal map(s) data from the UAS or from ground robotic vehicles equipped with sensors. The network design server may provide enrichments such as derived or deterministic data relationships to the Ai/ML module. The 3-D space map(s) data and 3-D signal quality map(s) data may be used as machine learning training data sets. The AI/ML module may produce an output as a series of trained network models that have been determined to be suitable for production.

In one embodiment, the network design server may use data related to potential network device profiles (e.g., tower, core, end user device, etc.) as inputs into the AI/ML module. In yet another embodiment, the AI/ML module may generate backhaul capabilities/capacities models as well. These models along with the network design models may be used for network design optimizations. This approach may, advantageously, allow for evaluation of an infinite number of network designs. In one embodiment, the network design server may be implemented as a blockchain peer and may record the network models (or predictive parameters) on a private blockchain discussed in more detail below. In one embodiment the AI/ML module may be configured to output a short list of network designs based on requirements or thresholds.

According to the embodiment of the present disclosure, the AI/ML module may be configured, with respect to the input 3-D mapping data, for pattern recognition of surface planes, corners, curvatures, angular and other characteristics as well as surface types. The AI/ML may be configured to output hybrid 3-D spatial surface outlines optimized for subsequent network design processing.

As discussed above, the network design server may collect 3-D space map(s) data and 3-D signal map(s) data from the UAS or from ground robotic vehicles equipped with sensors. The 3-D maps may be represented by a plethora of vertical planes or by an optimized route dot cloud collected from sensors installed robotic vehicles. The AI/ML module may implement data smoothing and interpolation for generation of network models. The AI/ML module may further implement volumization with respect to creation of continuous 3-D spatial outlines of potential backhaul options. In this scenario, the AI/ML module may output 3-D dot clouds specifying spatial outlines of network backhaul options.

The network design server may perform algorithmic modeling of objects by approximating more complex shapes with simpler/standard geometric shapes or, alternatively, irregular blobs (i.e., complex geometric shapes or dense clouds of points) for complex objects). The algorithmic modeling may employ methodology that relies on methods including but not limited to the following:

Object interchange tables providing object replacements. For example, hills are iteratively replaced with prisms, spheres, half-spheres or spherical segments, and half-cylinders; cow barns are replaced with 3-D rectangles with 3-D prism on top; silos are replaced with vertical cylinders; irrigation tanks or water/liquid storage tanks are replaced with horizontal half cylinders or cylinders. Other variations of the shape interchanges may be applied. The design server may evaluate shape errors and my assign the best fitting simpler shapes as final approximations.

The design server may perform mathematical modeling of signal propagation such as diffraction, reflection, refraction, absorption, polarization, scattering, etc., caused by the objects in 3-D space. The design server may analyze object surfaces or shapes that dictate signal propagation (transmission and receipt) relying on but not limited to:

1. Custom signal refraction tables previously produced by the ML module and calculations using surface characteristics defined above;
2. RF signal propagation and refraction formulae adjusted with ML-based correction terms previously determined for such surfaces.

The design server may use training of multiple ML models (e.g., neural network-based models, which include, but are not limited to Dense, Recurrent, and Convolution layers), which learn to predict signal strength as a function of input parameters or their learned combinations or transformations based on inputs included but not limited to in the following:

1. Directly observed parameters:
   Object types, locations, surfaces, etc.;
   Signal diffraction angles;
   Radio characteristics such as antenna profiles (azimuth and elevation), radio power, radio types/models, switch types/models, amplifier types/models, user device types/models and characteristics, etc.
2. Calculated hypothesis-driven parameters:
   Physical formulae of signal propagation around objects;
   Device characteristics into the RF physics formulae including:
   a. Numerous transmitter and receiver relative location and direction parameters used in a network configuration optimization algorithm, which explores an uncountably infinitely-large space of network configurations in a smart fashion using the ML model(s) plus RF-design vs cost implications of potential backhaul location choices (main vector plus signal dissipation functions around it) to evaluate coverage quality and to guide the search for an optimal or a near-optimal solution. Possible options include, but are not limited to Linear Programming, Generic Algorithm, Reinforcement learning.
   b. Identification of top solution(s):
   i. Finding a configuration of the best or near-best coverage, given a fixed budget and/or other optimization requirements;
   ii. Finding a configuration with the minimum or near-minimum cost, which provides minimum desired quality of coverage in a target area;
   iii. Given a relative cost-to-coverage-quality trade-off, finding a configuration which optimizes both objectives (cost and coverage) at once.

The design server may generate a final design based on cost selection by customers.

FIG. 1A illustrates a network diagram of a system for ML-based network design process employing photogrammetry surveillance data consistent with the present disclosure.

Referring to FIG. 1A, the example network 100 includes the design server node 102 connected to a cloud server node(s) 105 over a network. The cloud server node(s) 105 is configured to host an AI/ML module 107. The design server node 102 may receive 3-D mapping data from an UAS device 104 that flies over a target area 106 and collects data using video and/or sensory equipment. As discussed above, the UAS device 104 may collect photogrammetry data, LiDAR data and thermal imagery data which is derived via methods including but not limited to Photogrammerty, Radiometry, Photometry, Laser Scanning, etc. and a combination thereof.

The AI/ML module 107 may generate a predictive model(s) 108 based on historical network design-related data provided by the design server 102 from a local data storage 103 and based on the 3-D mapping data. The AI/ML module 107 may provide predictive outputs data that indicate locations and types of towers that are most optimal for the surveyed target area 106. Note that the AI/ML module 107 may be implemented on the design server node 102. The design server node 102 may process the predictive outputs data received from the AI/ML module 107 to generate a final network design for the target area 106. The AI/ML module 107 may use historical data that reflects previously studied and modeled dependencies. In one embodiment, the historical data may be recorded on a ledger of a private blockchain discussed in more detail below.

Figure 1B:
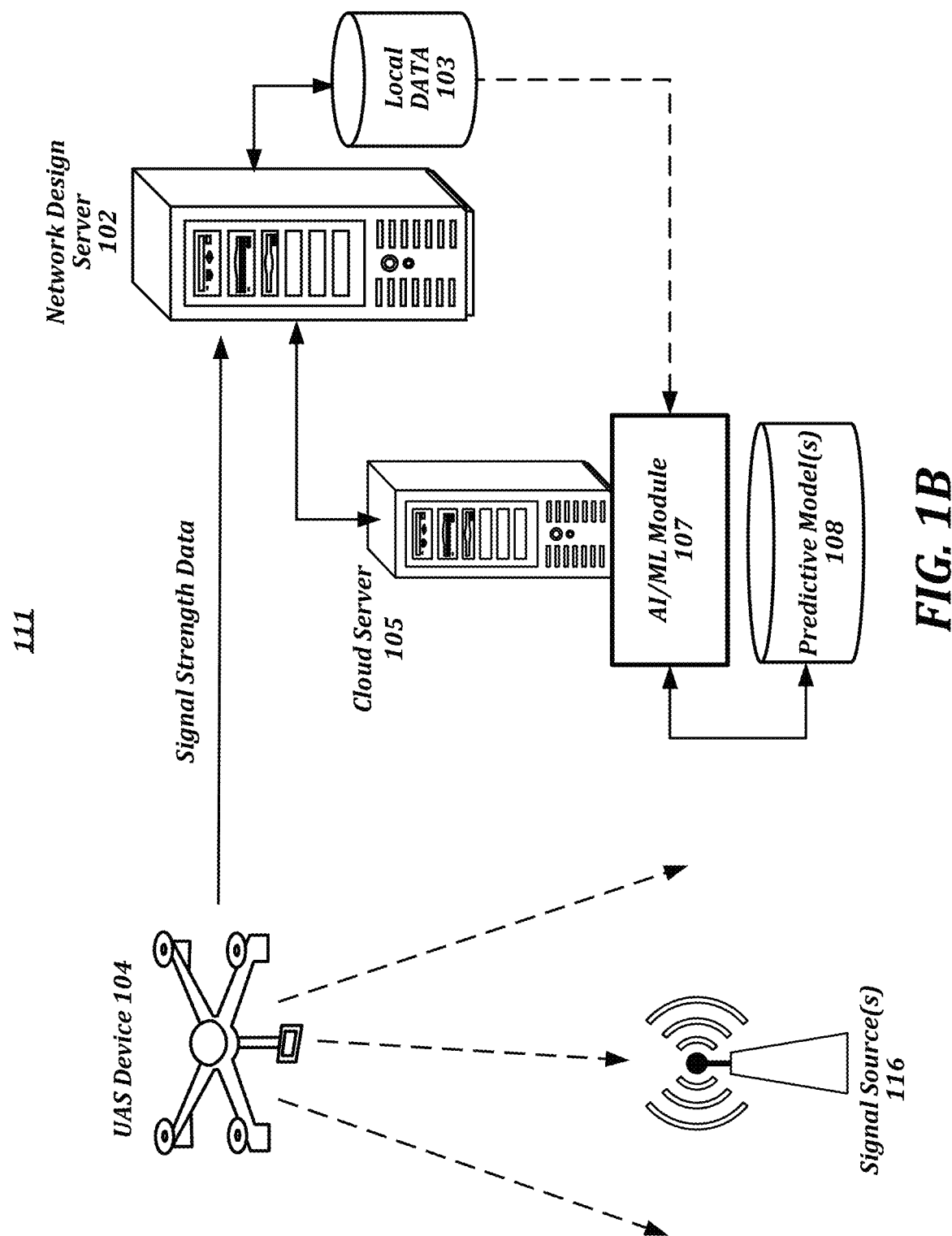
FIG. 1B illustrates a network diagram of a system for ML-based network design process employing signal strength data consistent with the present disclosure.

FIG. 1B illustrates a network diagram of a system for ML-based network design process employing signal strength data consistent with the present disclosure.

Referring to FIG. 1B, the example network 111 includes the design server node 102 connected to a cloud server node(s) 105 over a network. The cloud server node(s) 105 is configured to host an AI/ML module 107. The design server node 102 may receive signal strength data from the UAS device 104 that flies over a target area that has a signal source(s) 116 located within the target area and collects signal strength data using signal measurement equipment. The UAS device 104 may employ "slices" or "planes"—i.e., measured vertical flight planes (funnels) spaced away from each other at standard distances to be flown. In one embodiment, the UAS device 204 may employ horizontal, diagonal or other fight planes for collecting 3-D signal strength data. In yet another embodiment, the UAS 204 may employ a flight path predicted by the ML model, which may not be made of simple geometric forms. In one embodiment, a signal quality may be analyzed. The signal quality may include signal strength, latency and packet loss measured in a specific unit of 3-D space overlaid with simultaneous measurements of the density of user devices in that unit of 3-D space.

The AI/ML module 107 may be configured to implement ML/regression modeling of a signal strength in each funnel within each plane. The design server node 102 may determine usable signal strength area definition within each plane as well as usable signal strength area definition in 3-D space using smart interpolation that may be implemented by the AI/ML module 107.

The AI/ML module 107 may generate a predictive model(s) 108 based on historical network design-related data provided by the design server 102 from a local data storage 103 and based on the signal strength. The AI/ML module 107 may provide predictive outputs data that indicate locations, orientations and types of towers that are most optimal for the surveyed target area 106. Note that the AI/ML module 107 may be implemented on the design server node 102. The design server node 102 may process the predictive outputs data received from the AI/ML module 107 to generate a complete network design for the target area 106.

Figure 1C:
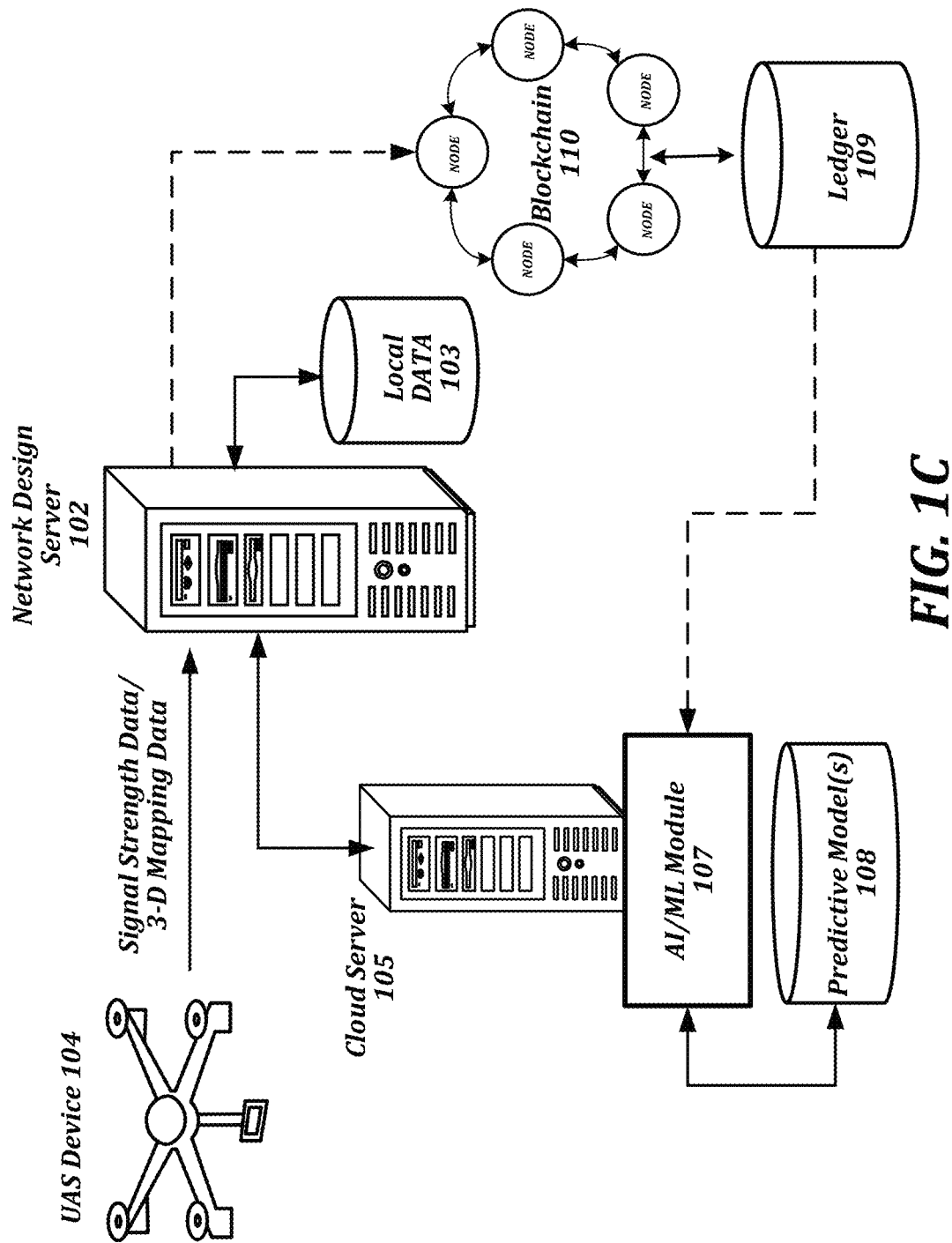
FIG. 1C illustrates a network diagram of a system for ML-based network design process employing surveillance data and a blockchain network consistent with the present disclosure.

FIG. 1C illustrates a network diagram of a system for ML-based network design process employing surveillance data and a blockchain network consistent with the present disclosure.

Referring to FIG. 1C, the example network 112 includes the design server node 102 connected to a cloud server node(s) 105 over a network. The cloud server node(s) 105 is configured to host an AI/ML module 107. The design server node 102 may receive surveillance data including signal strength data and 3-D mapping data from the UAS device 104 that flies over a target area and collects data using signal measurement equipment and video/LiDAR/thermal imagery equipment. As discussed above, the UAS device 104 may employ vertical planes (funnels) to be flown. The signal measurements in the funnels are implemented as sequential steps. The signal measurement data from each step may be recorded on a private blockchain 110. In this implementation the design server 102 and the cloud server 105 may server as blockchain 110 peer nodes. In one embodiment, the UAS device 104 may serve as a dynamic blockchain peer node as well. Note that signal quality data may be used instead of signal strength data. The signal quality data may include signal strength, latency and packet loss measured in a specific unit of 3-D space overlaid with simultaneous measurements of the density of user devices in that unit of 3-D space.

The AI/ML module 107 may be configured to implement ML/regression modeling of signal strength in each funnel within each flight plane. The design server node 102 may determine usable signal strength area definition within each plane as well as usable signal strength area definition in 3-D space using smart interpolation. The AI/ML module 107 may generate a predictive model(s) 108 based on historical network design-related data provided by the design server 102 from a local data storage 103, based on the photogrammetry data and the signal strength acquired from a blockchain ledger 109. As discussed above, the AI/ML module 107 may provide predictive outputs data that indicate locations, orientations and types of towers that are most optimal for the surveyed target area 106. Note that the AI/ML module 107 may be implemented on the design server node 102. The design server node 102 may process the predictive outputs data received from the AI/ML module 107 to generate a final network design for the target area 106.

Figure 2:
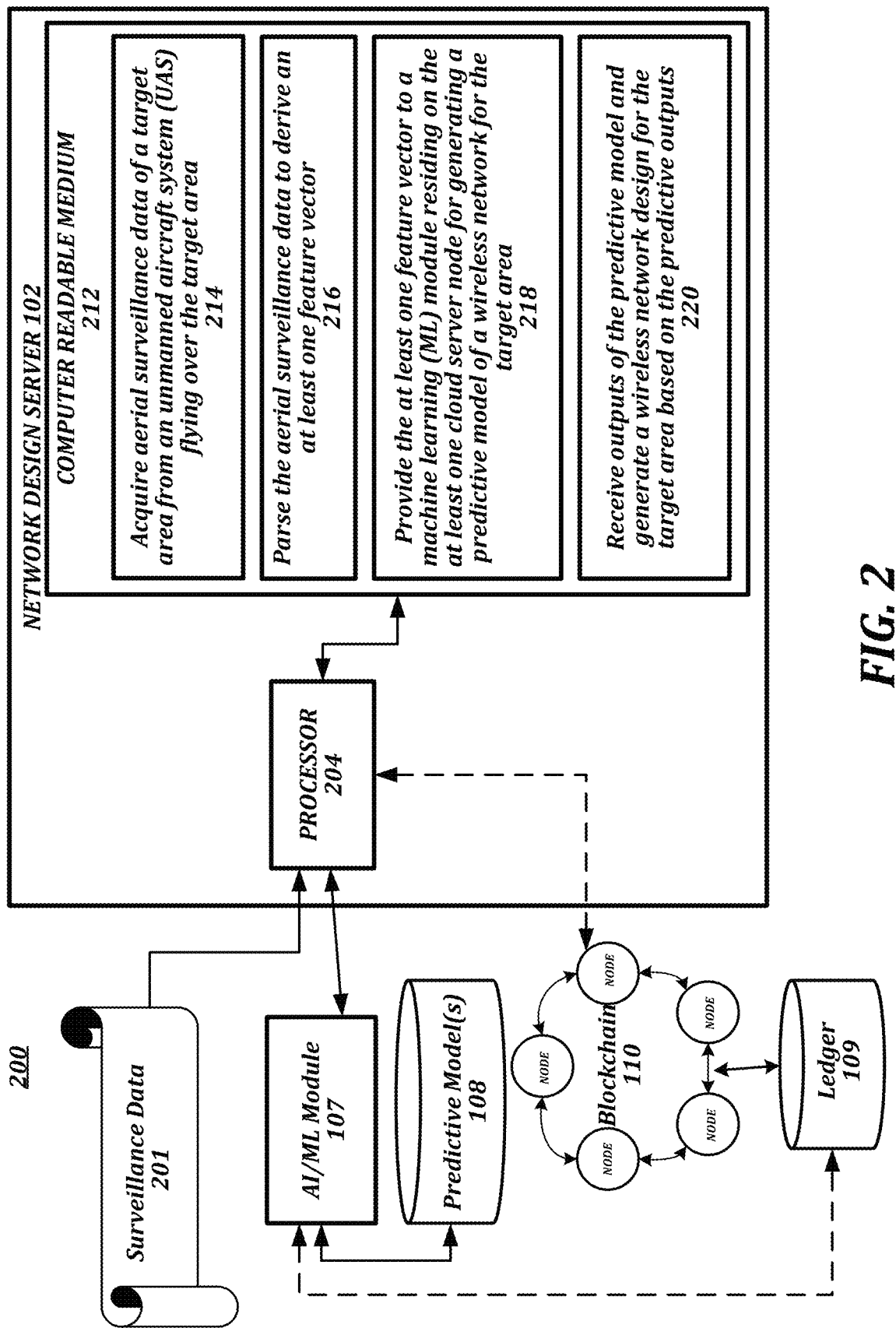
FIG. 2 illustrates a network diagram of a system including detailed features of a design server node consistent with the present disclosure.

FIG. 2 illustrates a network diagram of a system including detailed features of a design server node consistent with the present disclosure.

Referring to FIG. 2, the example network 200 includes the design server node 102 connected to a cloud server node(s) 105 over a network. The cloud server node(s) 105 is configured to host an AI/ML module 107. As discussed above with reference to FIG. 1C, the design server node 102 may receive surveillance data including signal strength data and 3-D mapping data from the UAS device 104 that flies over a target area and collects data.

The AI/ML module 107 may generate a predictive model(s) 108 based on historical network design-related data provided by the design server 102 from a local data storage 103, based on the surveillance data (i.e., the 3-D data and the signal strength data). The signal strength data may be recorded on a permissioned blockchain 110 ledger 109. As discussed above, the AI/ML module 107 may provide predictive outputs data that indicate network design parameters (e.g., locations, equipment orientations, vendors, models, configuration settings, and types of towers) that are most optimal for the surveyed target area. Note that the AI/ML module 107 may be implemented on the design server node 102 (not shown). The design server node 102 may process the predictive outputs data received from the AI/ML module 107 to generate a final network design for the target area 106. The AI/ML module 107 may be configured to codify deterministic base relationships characterizing known profiles/behaviors of any RF and other electronic elements that may be used in the target network design.

While this example describes in detail only one design server node 102, multiple such nodes may be connected to the network and to the blockchain 110. It should be understood that the design server node 102 may include additional components and that some of the components described herein may be removed and/or modified without departing from a scope of the design server node 102 disclosed herein. The design server node 102 may be a computing device or a server computer, or the like, and may include a processor 204, which may be a semiconductor-based microprocessor, a central processing unit (CPU), an application specific integrated circuit (ASIC), a field-programmable gate array (FPGA), and/or another hardware device. Although a single processor 204 is depicted, it should be understood that the design server node 102 may include multiple processors, multiple cores, or the like, without departing from the scope of the design server node 102 system.

The design server node 102 may also include a non-transitory computer readable medium 212 that may have stored thereon machine-readable instructions executable by the processor 204. Examples of the machine-readable instructions are shown as 214-220 and are further discussed below. Examples of the non-transitory computer readable medium 212 may include an electronic, magnetic, optical, or other physical storage device that contains or stores executable instructions. For example, the non-transitory computer readable medium 212 may be a Random-Access memory (RAM), an Electrically Erasable Programmable Read-Only Memory (EEPROM), a hard disk, an optical disc, or other type of storage device.

The processor 204 may fetch, decode, and execute the machine-readable instructions 214 to acquire aerial surveillance data of a target area from an unmanned aircraft system (UAS) flying over the target area. The processor 204 may fetch, decode, and execute the machine-readable instructions 216 to parse the aerial surveillance data to derive an at least one feature vector. The processor 204 may fetch, decode, and execute the machine-readable instructions 218 to provide the at least one feature vector to a machine learning (ML) module residing on the at least one cloud server node for generating a predictive model of a wireless network for the target area. The processor 204 may fetch, decode, and execute the machine-readable instructions 222 to receive a plurality of outputs of the predictive model and to generate a wireless network design for the target area based on the plurality of the predictive outputs. The permissioned blockchain 110 may be configured to use one or more smart contracts that manage transactions for multiple participating nodes.

FIG. 3A illustrates a flowchart of a method for ML-based network design and optimization of the design processing consistent with the present disclosure.

Referring to FIG. 3A, the method 300 may include one or more of the steps described below. FIG. 3A illustrates a flow chart of an example method executed by the design server 102 (see FIG. 2). It should be understood that method 300 depicted in FIG. 3A may include additional operations and that some of the operations described therein may be removed and/or modified without departing from the scope of the method 300. The description of the method 300 is also made with reference to the features depicted in FIG. 2 for purposes of illustration. Particularly, the processor 204 of the design server 102 may execute some or all of the operations included in the method 300.

With reference to FIG. 3A, at block 302, the processor 204 may acquire aerial surveillance data of a target area from an unmanned aircraft system (UAS) flying over the target area. At block 304, the processor 204 may parse the aerial surveillance data to derive an at least one feature vector. At block 306, the processor 204 may provide the at least one feature vector to a machine learning (ML) module residing on the at least one cloud server node for generating a predictive model of a wireless network for the target area. At block 308, the processor 204 may receive outputs of the predictive model and may generate a wireless network design for the target area based on the predictive outputs.

Figure 3B:
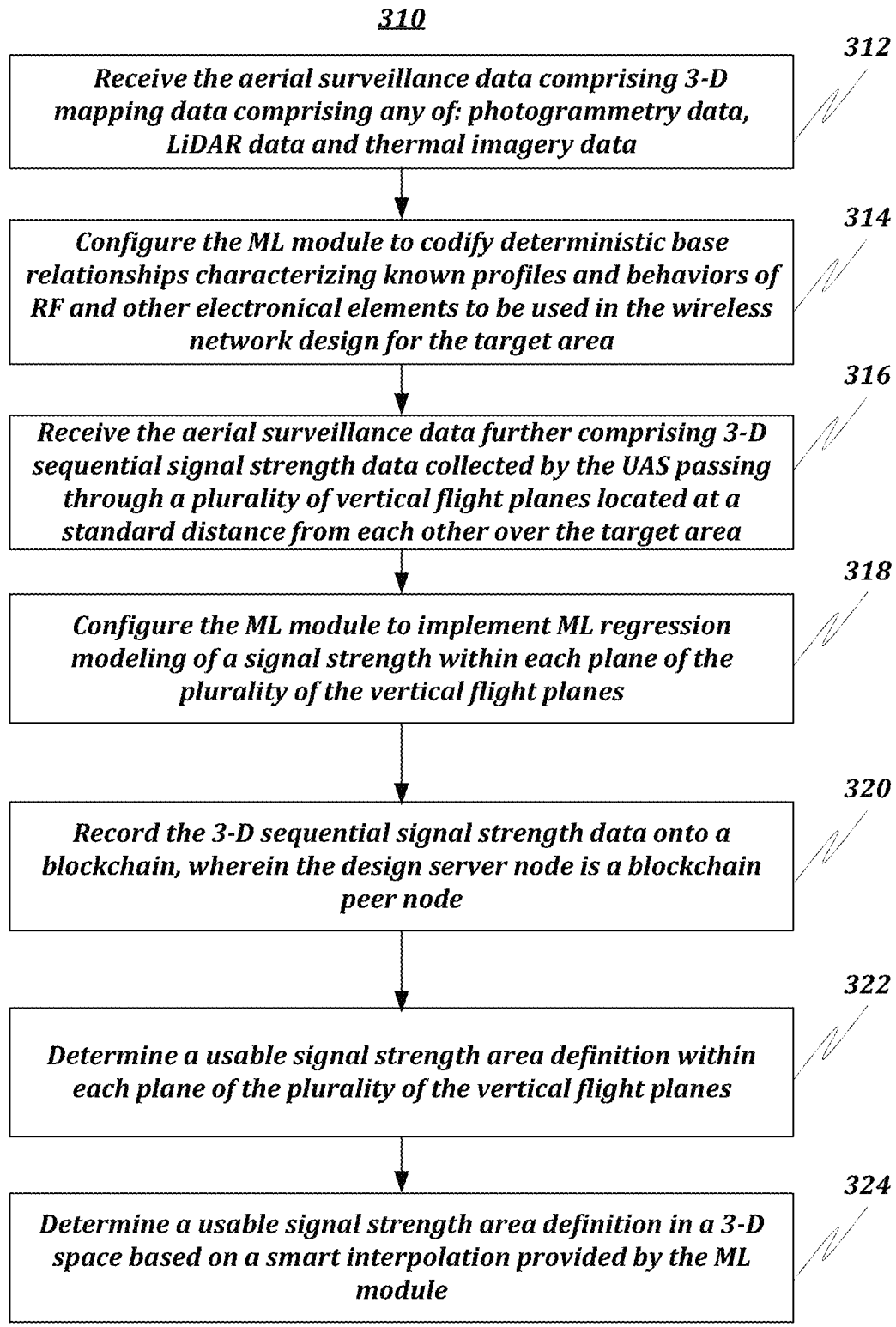
FIG. 3B illustrates a further flow chart of a method for ML-based network design and optimization of the design processing consistent with the present disclosure.

FIG. 3B illustrates a further flowchart of a method for ML-based network design and optimization of the design processing consistent with the present disclosure. Referring to FIG. 3B, the method 310 may include one or more of the steps described below. FIG. 3B illustrates a flow chart of an example method executed by the design server 102 (see FIG. 2). It should be understood that method 310 depicted in FIG. 3B may include additional operations and that some of the operations described therein may be removed and/or modified without departing from the scope of the method 310. The description of the method 310 is also made with reference to the features depicted in FIG. 2 for purposes of illustration. Particularly, the processor 204 of the design server 102 may execute some or all of the operations included in the method 300.

With reference to FIG. 3B, at block 312, the processor 204 may receive the aerial surveillance data comprising 3-D mapping data comprising any of but not limited to: photogrammetry data, LiDAR data and thermal imagery data. At block 314, the processor 204 may configure the ML module to codify deterministic base relationships characterizing known profiles and behaviors of RF and other electronical elements to be used in the wireless network design for the target area.

At block 316, the processor 204 may receive the aerial surveillance data further comprising 3-D sequential signal strength data collected by the UAS passing through a plurality of vertical flight planes located at a standard distance from each other and/or an algorithmically determined non-linear path specified as a set of waypoints over some or all of the target area. At block 318, the processor 204 may configure the ML module to implement ML regression modeling of a signal strength within each plane of the plurality of the vertical flight planes. In one embodiment, ML module may use an underlying neural network for modeling of signal quality indicators such as the signal strength. The ML module may use a combination of deterministic formulae as well as machine-learned independent-dependent variable relationships.

At block 320, the processor 204 may record the 3-D sequential signal strength data onto a blockchain, wherein the design server node is a blockchain peer node. At block 322, the processor 204 may determine a usable signal strength area definition within each plane of the plurality of the vertical flight planes. The process may use each cubic unit of space within the planes depending on precision requirements.

At block 324, the processor 204 may determine a usable signal strength area definition in a 3-D space based on a custom-algorithm interpolation provided by the ML module. The ML module may provide direct predictive calculations for a plethora of cubic units of space, or any combination thereof. Selection of a method to be used and/or method weight may be based on context-driven criteria determined to lead to most accurate results and optimal network designs. As discussed above, overall signal quality data may be collected. The signal quality data may include signal strength, latency and packet loss measured in a specific unit of 3-D space overlaid with simultaneous measurements of the density of user devices in that unit of 3-D space.

The above embodiments of the present disclosure may be implemented in hardware, in a computer-readable instructions executed by a processor, in firmware, or in a combination of the above. The computer computer-readable instructions may be embodied on a computer-readable medium, such as a storage medium. For example, the computer computer-readable instructions may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative embodiment, the processor and the storage medium may reside as discrete components. For example, FIG. 4 illustrates an example computing device (e.g., a server node) 400, which may represent or be integrated in any of the above-described components, etc.

Figure 4:
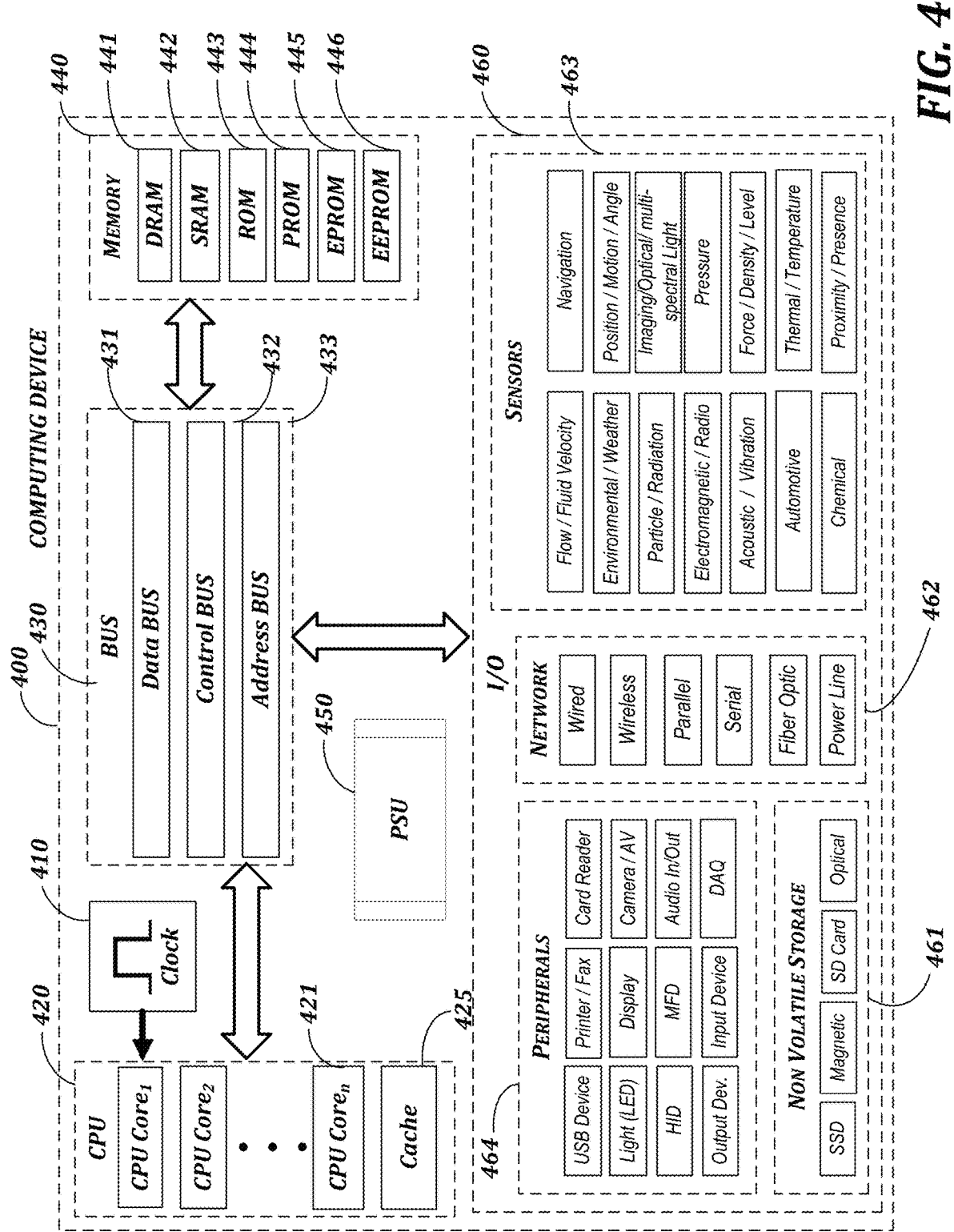
FIG. 4 illustrates a block diagram of a system including a computing device for performing the method of FIGS. 3A and 3B.

FIG. 4 illustrates a block diagram of a system including computing device 400. The computing device 400 may comprise, but not be limited to the following:

Mobile computing device, such as, but is not limited to, a laptop, a tablet, a smartphone, a drone, a wearable, an embedded device, a handheld device, an Arduino, an industrial device, or a remotely operable recording device;

A supercomputer, an exa-scale supercomputer, a mainframe, or a quantum computer;

A minicomputer, wherein the minicomputer computing device comprises, but is not limited to, an IBM AS400/iSeries/System 1, A DEC VAX/PDP, a HP3000, a Honeywell-Bull DPS, a Texas Instruments TI-990, or a Wang Laboratories VS Series;

A microcomputer, wherein the microcomputer computing device comprises, but is not limited to, a server, wherein a server may be rack mounted, a workstation, an industrial device, a raspberry pi, a desktop, or an embedded device;

The design server node 102 (see FIG. 2) may be hosted on a centralized server or on a cloud computing service. Although method 300 has been described to be performed by the design server node 102 implemented on a computing device 400, it should be understood that, in some embodiments, different operations may be performed by a plurality of the computing devices 400 in operative communication at least one network.

Embodiments of the present disclosure may comprise a computing device having a central processing unit (CPU) 420, a bus 430, a memory unit 440, a power supply unit (PSU) 450, and one or more Input/Output (I/O) units. The CPU 420 coupled to the memory unit 440 and the plurality of I/O units 460 via the bus 430, all of which are powered by the PSU 450. It should be understood that, in some embodiments, each disclosed unit may actually be a plurality of such units for the purposes of redundancy, high availability, and/or performance. The combination of the presently disclosed units is configured to perform the stages any method disclosed herein.

Consistent with an embodiment of the disclosure, the aforementioned CPU 420, the bus 430, the memory unit 440, a PSU 450, and the plurality of I/O units 460 may be implemented in a computing device, such as computing device 400. Any suitable combination of hardware, software, or firmware may be used to implement the aforementioned units. For example, the CPU 420, the bus 430, and the memory unit 440 may be implemented with computing device 400 or any of other computing devices 400, in combination with computing device 400. The aforementioned system, device, and components are examples and other systems, devices, and components may comprise the aforementioned CPU 420, the bus 430, the memory unit 440, consistent with embodiments of the disclosure.

At least one computing device 400 may be embodied as any of the computing elements illustrated in all of the attached figures, including the design server node 102 (FIG. 2). A computing device 400 does not need to be electronic, nor even have a CPU 420, nor bus 430, nor memory unit 440. The definition of the computing device 400 to a person having ordinary skill in the art is "A device that computes, especially a programmable [usually] electronic machine that performs high-speed mathematical or logical operations or that assembles, stores, correlates, or otherwise processes information." Any device which processes information qualifies as a computing device 400, especially if the processing is purposeful.

With reference to FIG. 4, a system consistent with an embodiment of the disclosure may include a computing device, such as computing device 400. In a basic configuration, computing device 400 may include at least one clock module 410, at least one CPU 420, at least one bus 430, and at least one memory unit 440, at least one PSU 450, and at least one I/O 460 module, wherein I/O module may be comprised of, but not limited to a non-volatile storage sub-module 461, a communication sub-module 462, a sensors sub-module 463, and a peripherals sub-module 464.

A system consistent with an embodiment of the disclosure the computing device 400 may include the clock module 410 may be known to a person having ordinary skill in the art as a clock generator, which produces clock signals. Clock signal is a particular type of signal that oscillates between a high and a low state and is used like a metronome to coordinate actions of digital circuits. Most integrated circuits (ICs) of sufficient complexity use a clock signal in order to synchronize different parts of the circuit, cycling at a rate slower than the worst-case internal propagation delays. The preeminent example of the aforementioned integrated circuit is the CPU 420, the central component of modern computers, which relies on a clock. The only exceptions are asynchronous circuits such as asynchronous CPUs. The clock 410 can comprise a plurality of embodiments, such as, but not limited to, single-phase clock which transmits all clock signals on effectively 1 wire, two-phase clock which distributes clock signals on two wires, each with non-overlapping pulses, and four-phase clock which distributes clock signals on 4 wires.

Many computing devices 400 use a "clock multiplier" which multiplies a lower frequency external clock to the appropriate clock rate of the CPU 420. This allows the CPU 420 to operate at a much higher frequency than the rest of the computer, which affords performance gains in situations where the CPU 420 does not need to wait on an external factor (like memory 440 or input/output 460). Some embodiments of the clock 410 may include dynamic frequency change, where, the time between clock edges can vary widely from one edge to the next and back again.

A system consistent with an embodiment of the disclosure the computing device 400 may include the CPU unit 420 comprising at least one CPU Core 421. A plurality of CPU cores 421 may comprise identical CPU cores 421, such as, but not limited to, homogeneous multi-core systems. It is also possible for the plurality of CPU cores 421 to comprise different CPU cores 421, such as, but not limited to, heterogeneous multi-core systems, big.LITTLE systems and some AMD accelerated processing units (APU). The CPU unit 420 reads and executes program instructions which may be used across many application domains, for example, but not limited to, general purpose computing, embedded computing, network computing, digital signal processing (DSP), and graphics processing (GPU). The CPU unit 420 may run multiple instructions on separate CPU cores 421 at the same time. The CPU unit 420 may be integrated into at least one of a single integrated circuit die and multiple dies in a single chip package. The single integrated circuit die and multiple dies in a single chip package may contain a plurality of other aspects of the computing device 400, for example, but not limited to, the clock 410, the CPU 420, the bus 430, the memory 440, and I/O 460.

The CPU unit 420 may contain cache 422 such as, but not limited to, a level 1 cache, level 2 cache, level 3 cache or combination thereof. The aforementioned cache 422 may or may not be shared amongst a plurality of CPU cores 421. The cache 422 sharing comprises at least one of message passing and inter-core communication methods may be used for the at least one CPU Core 421 to communicate with the cache 422. The inter-core communication methods may comprise, but not limited to, bus, ring, two-dimensional mesh, and crossbar. The aforementioned CPU unit 420 may employ symmetric multiprocessing (SMP) design.

The plurality of the aforementioned CPU cores 421 may comprise soft microprocessor cores on a single field programmable gate array (FPGA), such as semiconductor intellectual property cores (IP Core). The plurality of CPU cores 421 architecture may be based on at least one of, but not limited to, Complex instruction set computing (CISC), Zero instruction set computing (ZISC), and Reduced instruction set computing (RISC). At least one of the performance-enhancing methods may be employed by the plurality of the CPU cores 421, for example, but not limited to Instruction-level parallelism (ILP) such as, but not limited to, super-scalar pipelining, and Thread-level parallelism (TLP).

Consistent with the embodiments of the present disclosure, the aforementioned computing device 400 may employ a communication system that transfers data between components inside the aforementioned computing device 400, and/or the plurality of computing devices 400. The aforementioned communication system will be known to a person having ordinary skill in the art as a bus 430. The bus 430 may embody internal and/or external plurality of hardware and software components, for example, but not limited to a wire, optical fiber, communication protocols, and any physical arrangement that provides the same logical function as a parallel electrical bus. The bus 430 may comprise at least one of, but not limited to a parallel bus, wherein the parallel bus carry data words in parallel on multiple wires, and a serial bus, wherein the serial bus carry data in bit-serial form. The bus 430 may embody a plurality of topologies, for example, but not limited to, a multidrop/electrical parallel topology, a daisy chain topology, and a connected by switched hubs, such as USB bus. The bus 430 may comprise a plurality of embodiments, for example, but not limited to:

- Internal data bus (data bus) 431/Memory bus
- Control bus 432
- Address bus 433
- System Management Bus (SMBus)
- Front-Side-Bus (FSB)
- External Bus Interface (EBI)
- Local bus
- Expansion bus
- Lightning bus
- Controller Area Network (CAN bus)
- Camera Link
- ExpressCard
- Advanced Technology management Attachment (ATA), including embodiments and derivatives such as, but not limited to, Integrated Drive Electronics (IDE)/Enhanced IDE (EIDE), ATA Packet Interface (ATAPI), Ultra-Direct Memory Access (UDMA), Ultra ATA (UATA)/Parallel ATA (PATA)/Serial ATA (SATA), CompactFlash (CF) interface, Consumer Electronics ATA (CE-ATA)/Fiber Attached Technology Adapted (FATA), Advanced Host Controller Interface (AHCI), SATA Express (SATAe)/External SATA (eSATA), including the powered embodiment eSATAp/Mini-SATA (mSATA), and Next Generation Form Factor (NGFF)/M.2.
- Small Computer System Interface (SCSI)/Serial Attached SCSI (SAS)
- HyperTransport
- InfiniBand
- RapidIO
- Mobile Industry Processor Interface (MIPI)
- Coherent Processor Interface (CAPI)
- Plug-n-play
- 1-Wire
- Peripheral Component Interconnect (PCI), including embodiments such as, but not limited to, Accelerated Graphics Port (AGP), Peripheral Component Interconnect extended (PCI-X), Peripheral Component Interconnect Express (PCI-e) (e.g., PCI Express Mini Card, PCI Express M.2 [Mini PCIe v2], PCI Express External Cabling [ePCIe], and PCI Express OCuLink [Optical Copper{Cu} Link]), Express Card, AdvancedTCA, AMC, Universal 10, Thunderbolt/Mini DisplayPort, Mobile PCIe (M-PCIe), U.2, and Non-Volatile Memory Express (NVMe)/Non-Volatile Memory Host Controller Interface Specification (NVMHCIS).
- Industry Standard Architecture (ISA), including embodiments such as, but not limited to Extended ISA (EISA), PC/XT-bus/PC/AT-bus/PC/104 bus (e.g., PC/104-Plus, PCI/104-Express, PCI/104, and PCI-104), and Low Pin Count (LPC).
- Music Instrument Digital Interface (MIDI)
- Universal Serial Bus (USB), including embodiments such as, but not limited to, Media Transfer Protocol (MTP)/Mobile High-Definition Link (MHL), Device Firmware Upgrade (DFU), wireless USB, InterChip USB, IEEE 1394 Interface/Firewire, Thunderbolt, and extensible Host Controller Interface (xHCI).

Consistent with the embodiments of the present disclosure, the aforementioned computing device 400 may employ hardware integrated circuits that store information for immediate use in the computing device 400, know to the person having ordinary skill in the art as primary storage or memory 440. The memory 440 operates at high speed, distinguishing it from the non-volatile storage sub-module 461, which may be referred to as secondary or tertiary storage, which provides slow-to-access information but offers higher capacities at lower cost. The contents contained in memory 440, may be transferred to secondary storage via techniques such as, but not limited to, virtual memory and swap. The memory 440 may be associated with addressable semiconductor memory, such as integrated circuits consisting of silicon-based transistors, used for example as primary storage but also other purposes in the computing device 400. The memory 440 may comprise a plurality of embodiments, such as, but not limited to volatile memory, non-volatile memory, and semi-volatile memory. It should be understood by a person having ordinary skill in the art that the ensuing are non-limiting examples of the aforementioned memory:

- Volatile memory which requires power to maintain stored information, for example, but not limited to, Dynamic Random-Access Memory (DRAM) 441, Static Random-Access Memory (SRAM) 442, CPU Cache memory 425, Advanced Random-Access Memory (A-RAM), and other types of primary storage such as Random-Access Memory (RAM).
- Non-volatile memory which can retain stored information even after power is removed, for example, but not limited to, Read-Only Memory (ROM) 443, Programmable ROM (PROM) 444, Erasable PROM (EPROM) 445, Electrically Erasable PROM (EEPROM) 446 (e.g., flash memory and Electrically Alterable PROM [EAPROM]), Mask ROM (MROM), One Time Programable (OTP) ROM/Write Once Read Many (WORM), Ferroelectric RAM (FeRAM), Parallel Random-Access Machine (PRAM), Split-Transfer Torque RAM (STT-RAM), Silicon Oxime Nitride Oxide Silicon (SONOS), Resistive RAM (RRAM), Nano RAM (NRAM), 3D XPoint, Domain-Wall Memory (DWM), and millipede memory.
- Semi-volatile memory which may have some limited non-volatile duration after power is removed but loses data after said duration has passed. Semi-volatile memory provides high performance, durability, and other valuable characteristics typically associated with volatile memory, while providing some benefits of true non-volatile memory. The semi-volatile memory may comprise volatile and non-volatile memory and/or volatile memory with battery to provide power after power is removed. The semi-volatile memory may comprise, but not limited to spin-transfer torque RAM (STT-RAM).

Consistent with the embodiments of the present disclosure, the aforementioned computing device 400 may employ the communication system between an information processing system, such as the computing device 400, and the outside world, for example, but not limited to, human, environment, and another computing device 400. The aforementioned communication system will be known to a person having ordinary skill in the art as I/O 460. The I/O module 460 regulates a plurality of inputs and outputs with regard to the computing device 400, wherein the inputs are a plurality of signals and data received by the computing device 400, and the outputs are the plurality of signals and data sent from the computing device 400. The I/O module 460 interfaces a plurality of hardware, such as, but not limited to, non-volatile storage 461, communication devices 462, sensors 463, and peripherals 464. The plurality of hardware is used by the at least one of, but not limited to, human, environment, and another computing device 400 to communicate with the present computing device 400. The I/O module 460 may comprise a plurality of forms, for example, but not limited to channel I/O, port mapped I/O, asynchronous I/O, and Direct Memory Access (DMA).

Consistent with the embodiments of the present disclosure, the aforementioned computing device 400 may employ the non-volatile storage sub-module 461, which may be referred to by a person having ordinary skill in the art as one of secondary storage, external memory, tertiary storage, off-line storage, and auxiliary storage. The non-volatile storage sub-module 461 may not be accessed directly by the CPU 420 without using intermediate area in the memory 440. The non-volatile storage sub-module 461 does not lose data when power is removed and may be two orders of magnitude less costly than storage used in memory module, at the expense of speed and latency. The non-volatile storage sub-module 461 may comprise a plurality of forms, such as, but not limited to, Direct Attached Storage (DAS), Network Attached Storage (NAS), Storage Area Network (SAN), nearline storage, Massive Array of Idle Disks (MAID), Redundant Array of Independent Disks (RAID), device mirroring, off-line storage, and robotic storage. The non-volatile storage sub-module (461) may comprise a plurality of embodiments, such as, but not limited to:

Optical storage, for example, but not limited to, Compact Disk (CD) (CD-ROM/CD-R/CD-RW), Digital Versatile Disk (DVD) (DVD-ROM/DVD-R/DVD+R/DVD-RW/DVD+RW/DVD+RW/DVD+R DL/DVD-RAM/HD-DVD), Blu-ray Disk (BD) (BD-ROM/BD-R/BD-RE/BD-R DL/BD-RE DL), and Ultra-Density Optical (UDO).

Semiconductor storage, for example, but not limited to, flash memory, such as, but not limited to, USB flash drive, Memory card, Subscriber Identity Module (SIM) card, Secure Digital (SD) card, Smart Card, CompactFlash (CF) card, Solid-State Drive (SSD) and memristor.

Magnetic storage such as, but not limited to, Hard Disk Drive (HDD), tape drive, carousel memory, and Card Random-Access Memory (CRAM).

Phase-change memory

Holographic data storage such as Holographic Versatile Disk (HVD).

Molecular Memory

Deoxyribonucleic Acid (DNA) digital data storage

Consistent with the embodiments of the present disclosure, the aforementioned computing device 400 may employ the communication sub-module 462 as a subset of the I/O 460, which may be referred to by a person having ordinary skill in the art as at least one of, but not limited to, computer network, data network, and network. The network allows computing devices 400 to exchange data using connections, which may be known to a person having ordinary skill in the art as data links, between network nodes. The nodes comprise network computer devices 400 that originate, route, and terminate data. The nodes are identified by network addresses and can include a plurality of hosts consistent with the embodiments of a computing device 400. The aforementioned embodiments include, but not limited to personal computers, phones, servers, drones, and networking devices such as, but not limited to, hubs, switches, routers, modems, and firewalls.

Two nodes can be said are networked together, when one computing device 400 is able to exchange information with the other computing device 400, whether or not they have a direct connection with each other. The communication sub-module 462 supports a plurality of applications and services, such as, but not limited to World Wide Web (WWW), digital video and audio, shared use of application and storage computing devices 400, printers/scanners/fax machines, email/online chat/instant messaging, remote control, distributed computing, etc. The network may comprise a plurality of transmission mediums, such as, but not limited to conductive wire, fiber optics, and wireless. The network may comprise a plurality of communications protocols to organize network traffic, wherein application-specific communications protocols are layered, may be known to a person having ordinary skill in the art as carried as payload, over other more general communications protocols. The plurality of communications protocols may comprise, but not limited to, IEEE 802, ethernet, Wireless LAN (WLAN/Wi-Fi), Internet Protocol (IP) suite (e.g., TCP/IP, UDP, Internet Protocol version 4 [IPv4], and Internet Protocol version 6 [IPv6]), Synchronous Optical Networking (SONET)/Synchronous Digital Hierarchy (SDH), Asynchronous Transfer Mode (ATM), and cellular standards (e.g., Global System for Mobile Communications [GSM], General Packet Radio Service [GPRS], Code-Division Multiple Access [CDMA], and Integrated Digital Enhanced Network [IDEN]).

The communication sub-module 462 may comprise a plurality of size, topology, traffic control mechanism and organizational intent. The communication sub-module 462 may comprise a plurality of embodiments, such as, but not limited to:

Wired communications, such as, but not limited to, coaxial cable, phone lines, twisted pair cables (ethernet), and InfiniBand.

Wireless communications, such as, but not limited to, communications satellites, cellular systems, radio frequency/spread spectrum technologies, IEEE 802.11 Wi-Fi, Bluetooth, NFC, free-space optical communications, terrestrial microwave, and Infrared (IR) communications. Wherein cellular systems embody technologies such as, but not limited to, 3G, 4G (such as WiMax and LTE), and 5G (short and long wavelength).

Parallel communications, such as, but not limited to, LPT ports.

Serial communications, such as, but not limited to, RS-232 and USB.

Fiber Optic communications, such as, but not limited to, Single-mode optical fiber (SMF) and Multi-mode optical fiber (MMF).

Power Line and wireless communications

The aforementioned network may comprise a plurality of layouts, such as, but not limited to, bus network such as ethernet, star network such as Wi-Fi, ring network, mesh network, fully connected network, and tree network. The network can be characterized by its physical capacity or its organizational purpose. Use of the network, including user authorization and access rights, differ accordingly. The characterization may include, but not limited to nanoscale network, Personal Area Network (PAN), Local Area Network (LAN), Home Area Network (HAN), Storage Area Network (SAN), Campus Area Network (CAN), backbone network, Metropolitan Area Network (MAN), Wide Area Network (WAN), enterprise private network, Virtual Private Network (VPN), and Global Area Network (GAN).

Consistent with the embodiments of the present disclosure, the aforementioned computing device 400 may employ the sensors sub-module 463 as a subset of the I/O 460. The sensors sub-module 463 comprises at least one of the devices, modules, and subsystems whose purpose is to detect events or changes in its environment and send the information to the computing device 400. Sensors are sensitive to the measured property, are not sensitive to any property not measured, but may be encountered in its application, and do not significantly influence the measured property. The sensors sub-module 463 may comprise a plurality of digital devices and analog devices, wherein if an analog device is used, an Analog to Digital (A-to-D) converter must be employed to interface the said device with the computing device 400. The sensors may be subject to a plurality of deviations that limit sensor accuracy. The sensors sub-module 463 may comprise a plurality of embodiments, such as, but not limited to, chemical sensors, automotive sensors, acoustic/sound/vibration sensors, electric current/electric potential/magnetic/radio sensors, environmental/weather/moisture/humidity sensors, flow/fluid velocity sensors, ionizing radiation/particle sensors, navigation sensors, position/angle/displacement/distance/speed/acceleration sensors, imaging/optical/light sensors, pressure sensors, force/density/level sensors, thermal/temperature sensors, and proximity/presence sensors. It should be understood by a person having ordinary skill in the art that the ensuing are non-limiting examples of the aforementioned sensors:

Chemical sensors, such as, but not limited to, breathalyzer, carbon dioxide sensor, carbon monoxide/smoke detector, catalytic bead sensor, chemical field-effect transistor, chemiresistor, electrochemical gas sensor, electronic nose, electrolyte-insulator-semiconductor sensor, energy-dispersive X-ray spectroscopy, fluorescent chloride sensors, holographic sensor, hydrocarbon dew point analyzer, hydrogen sensor, hydrogen sulfide sensor, infrared point sensor, ion-selective electrode, nondispersive infrared sensor, microwave chemistry sensor, nitrogen oxide sensor, olfactometer, optode, oxygen sensor, ozone monitor, pellistor, pH glass electrode, potentiometric sensor, redox electrode, zinc oxide nanorod sensor, and biosensors (such as nanosensors).

Automotive sensors, such as, but not limited to, air flow meter/mass airflow sensor, air-fuel ratio meter, AFR sensor, blind spot monitor, engine coolant/exhaust gas/cylinder head/transmission fluid temperature sensor, hall effect sensor, wheel/automatic transmission/turbine/vehicle speed sensor, airbag sensors, brake fluid/engine crankcase/fuel/oil/tire pressure sensor, camshaft/crankshaft/throttle position sensor, fuel/oil level sensor, knock sensor, light sensor, MAP sensor, oxygen sensor (02), parking sensor, radar sensor, torque sensor, variable reluctance sensor, and water-in-fuel sensor.

Acoustic, sound and vibration sensors, such as, but not limited to, microphone, lace sensor (guitar pickup), seismometer, sound locator, geophone, and hydrophone.

Electric current, electric potential, magnetic, and radio sensors, such as, but not limited to, current sensor, Daly detector, electroscope, electron multiplier, faraday cup, galvanometer, hall effect sensor, hall probe, magnetic anomaly detector, magnetometer, magnetoresistance, MEMS magnetic field sensor, metal detector, planar hall sensor, radio direction finder, and voltage detector.

Environmental, weather, moisture, and humidity sensors, such as, but not limited to, actinometer, air pollution sensor, bedwetting alarm, ceilometer, dew warning, electrochemical gas sensor, fish counter, frequency domain sensor, gas detector, hook gauge evaporimeter, humistor, hygrometer, leaf sensor, lysimeter, pyranometer, pyrgeometer, psychrometer, rain gauge, rain sensor, seismometers, SNOTEL, snow gauge, soil moisture sensor, stream gauge, and tide gauge.

Flow and fluid velocity sensors, such as, but not limited to, air flow meter, anemometer, flow sensor, gas meter, mass flow sensor, and water meter.

Ionizing radiation and particle sensors, such as, but not limited to, cloud chamber, Geiger counter, Geiger-Muller tube, ionization chamber, neutron detection, proportional counter, scintillation counter, semiconductor detector, and thermoluminescent dosimeter.

Navigation sensors, such as, but not limited to, air speed indicator, altimeter, attitude indicator, depth gauge, fluxgate compass, gyroscope, inertial navigation system, inertial reference unit, magnetic compass, MHD sensor, ring laser gyroscope, turn coordinator, variometer, vibrating structure gyroscope, and yaw rate sensor.

Position, angle, displacement, distance, speed, and acceleration sensors, such as, but not limited to, accelerometer, displacement sensor, flex sensor, free fall sensor, gravimeter, impact sensor, laser rangefinder, LIDAR, odometer, photoelectric sensor, position sensor such as, but not limited to, GPS or Glonass, angular rate sensor, shock detector, ultrasonic sensor, tilt sensor, tachometer, ultra-wideband radar, variable reluctance sensor, and velocity receiver.

Imaging, optical and light sensors, such as, but not limited to, CMOS sensor, LIDAR, multi-spectral light sensor, colorimeter, contact image sensor, electro-optical sensor, infrared sensor, kinetic inductance detector, LED as light sensor, light-addressable potentiometric sensor, Nichols radiometer, fiber-optic sensors, optical position sensor, thermopile laser sensor, photodetector, photodiode, photomultiplier tubes, phototransistor, photoelectric sensor, photoionization detector, photomultiplier, photoresistor, photoswitch, phototube, scintillometer, Shack-Hartmann, single-photon avalanche diode, superconducting nanowire single-photon detector, transition edge sensor, visible light photon counter, and wavefront sensor.

Pressure sensors, such as, but not limited to, barograph, barometer, boost gauge, bourdon gauge, hot filament ionization gauge, ionization gauge, McLeod gauge, Oscillating U-tube, permanent downhole gauge, piezometer, Pirani gauge, pressure sensor, pressure gauge, tactile sensor, and time pressure gauge.

Force, Density, and Level sensors, such as, but not limited to, bhangmeter, hydrometer, force gauge or force sensor, level sensor, load cell, magnetic level or nuclear density sensor or strain gauge, piezocapacitive pressure sensor, piezoelectric sensor, torque sensor, and viscometer.

Thermal and temperature sensors, such as, but not limited to, bolometer, bimetallic strip, calorimeter, exhaust gas temperature gauge, flame detection/pyrometer, Gardon gauge, Golay cell, heat flux sensor, microbolometer, microwave radiometer, net radiometer, infrared/quartz/resistance thermometer, silicon bandgap temperature sensor, thermistor, and thermocouple.

Proximity and presence sensors, such as, but not limited to, alarm sensor, doppler radar, motion detector, occupancy sensor, proximity sensor, passive infrared sensor, reed switch, stud finder, triangulation sensor, touch switch, and wired glove.

Consistent with the embodiments of the present disclosure, the aforementioned computing device 400 may employ the peripherals sub-module 462 as a subset of the I/O 460. The peripheral sub-module 464 comprises ancillary devices uses to put information into and get information out of the computing device 400. There are 3 categories of devices comprising the peripheral sub-module 464, which exist based on their relationship with the computing device 400, input devices, output devices, and input/output devices. Input devices send at least one of data and instructions to the computing device 400. Input devices can be categorized based on, but not limited to:

Modality of input, such as, but not limited to, mechanical motion, audio, visual, and tactile.

Whether the input is discrete, such as but not limited to, pressing a key, or continuous such as, but not limited to position of a mouse.

The number of degrees of freedom involved, such as, but not limited to, two-dimensional mice vs three-dimensional mice used for Computer-Aided Design (CAD) applications.

Output devices provide output from the computing device 400. Output devices convert electronically generated information into a form that can be presented to humans. Input/output devices perform that perform both input and output functions. It should be understood by a person having ordinary skill in the art that the ensuing are non-limiting embodiments of the aforementioned peripheral sub-module 464:

Input Devices

Human Interface Devices (HID), such as, but not limited to, pointing device (e.g., mouse, touchpad, joystick, touchscreen, game controller/gamepad, remote, light pen, light gun, Wii remote, jog dial, shuttle, and knob), keyboard, graphics tablet, digital pen, gesture recognition devices, magnetic ink character recognition, Sip-and-Puff (SNP) device, and Language Acquisition Device (LAD).

High degree of freedom devices, that require up to six degrees of freedom such as, but not limited to, camera gimbals, Cave Automatic Virtual Environment (CAVE), and virtual reality systems.

Video Input devices are used to digitize images or video from the outside world into the computing device 400. The information can be stored in a multitude of formats depending on the user's requirement. Examples of types of video input devices include, but not limited to, digital camera, digital camcorder, portable media player, webcam, Microsoft Kinect, image scanner, fingerprint scanner, barcode reader, 3D scanner, laser rangefinder, eye gaze tracker, computed tomography, magnetic resonance imaging, positron emission tomography, medical ultrasonography, TV tuner, and iris scanner.

Audio input devices are used to capture sound. In some cases, an audio output device can be used as an input device, in order to capture produced sound. Audio input devices allow a user to send audio signals to the computing device 400 for at least one of processing, recording, and carrying out commands. Devices such as microphones allow users to speak to the computer in order to record a voice message or navigate software. Aside from recording, audio input devices are also used with speech recognition software. Examples of types of audio input devices include, but not limited to microphone, Musical Instrumental Digital Interface (MIDI) devices such as, but not limited to a keyboard, and headset.

Data Acquisition (DAQ) devices convert at least one of analog signals and physical parameters to digital values for processing by the computing device 400. Examples of DAQ devices may include, but not limited to, Analog to Digital Converter (ADC), data logger, signal conditioning circuitry, multiplexer, and Time to Digital Converter (TDC).

Output Devices may further comprise, but not be limited to:

Display devices, which convert electrical information into visual form, such as, but not limited to, monitor, TV, projector, and Computer Output Microfilm (COM). Display devices can use a plurality of underlying technologies, such as, but not limited to, Cathode-Ray Tube (CRT), Thin-Film Transistor (TFT), Liquid Crystal Display (LCD), Organic Light-Emitting Diode (OLED), MicroLED, E Ink Display (ePaper) and Refreshable Braille Display (Braille Terminal).

Printers, such as, but not limited to, inkjet printers, laser printers, 3D printers, solid ink printers and plotters.

Audio and Video (AV) devices, such as, but not limited to, speakers, headphones, amplifiers and lights, which include lamps, strobes, DJ lighting, stage lighting, architectural lighting, special effect lighting, and lasers.

Other devices such as Digital to Analog Converter (DAC)

Input/Output Devices may further comprise, but not be limited to, touchscreens, networking device (e.g., devices disclosed in network 462 sub-module), data storage device (non-volatile storage 461), facsimile (FAX), and graphics/sound cards.

All rights including copyrights in the code included herein are vested in and the property of the Applicant. The Applicant retains and reserves all rights in the code included herein, and grants permission to reproduce the material only in connection with reproduction of the granted patent and for no other purpose.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as examples for embodiments of the disclosure.

Insofar as the description above and the accompanying drawing disclose any additional subject matter that is not within the scope of the claims below, the disclosures are not dedicated to the public and the right to file one or more applications to claims such additional disclosures is reserved.

The following is claimed:

1. A system, comprising:
a processor of a design server node connected to at least one cloud server node over a network; and
a memory on which are stored machine-readable instructions that when executed by the processor, cause the processor to:
acquire aerial surveillance data of a target area from an unmanned aircraft system (UAS) flying over the target area;
parse the aerial surveillance data to derive an at least one feature vector;
provide the at least one feature vector to a machine learning (ML) module residing on the at least one cloud server node for generating a predictive model of a wireless network for the target area;
receive outputs of the predictive model;
generate a wireless network design for the target area based on the predictive outputs; and
configure the ML module to codify deterministic base relationships characterizing known profiles and behaviors of radio frequency (RF) and other electronic elements to be used in the wireless network design for the target area.

2. The system of claim 1, wherein the aerial surveillance data comprises 3-D mapping data comprising any of: photogrammetry data, LiDAR data and thermal imagery data.

3. The system of claim 2, wherein the aerial surveillance data further comprises 3-D sequential signal strength data collected by the UAS passing through a plurality of vertical flight planes located at a standard distance from each other over the target area.

4. The system of claim 3, wherein the instructions further cause the processor to configure the ML module to implement ML regression modeling of a signal strength within each plane of the plurality of the vertical flight planes.

5. The system of claim 3, wherein the instructions further cause the processor to record the 3-D sequential signal quality data onto a blockchain, wherein the design server node is a blockchain peer node.

6. The system of claim 3, wherein the instructions further cause the processor to determine a usable signal strength area definition within each plane of the plurality of the vertical flight planes.

7. A method, comprising:
acquiring, by a design server node, aerial surveillance data of a target area from an unmanned aircraft system (UAS) flying over the target area;
parsing, by the design server node, the aerial surveillance data to derive an at least one feature vector;
providing, by the design server node, the at least one feature vector to a machine learning (ML) module residing on the at least one cloud server node for generating a predictive model of a wireless network for the target area;
receiving, by the design server node, a plurality of outputs of the predictive model;
generating a wireless network design for the target area based on the plurality of the predictive outputs; and
configuring the ML module to codify deterministic base relationships characterizing known profiles and behaviors of radio frequency (RF) and other electronic elements to be used in the wireless network design for the target area.

8. The method of claim 7, further comprising receiving the aerial surveillance data comprising 3-D mapping data comprising any of: photogrammetry data, LiDAR data and thermal imagery data.

9. The method of claim 8, further comprising configuring the ML module to implement ML regression modeling of a signal strength within each plane of the plurality of the vertical flight planes.

10. The method of claim 8, further comprising recording the 3-D sequential signal strength data onto a blockchain, wherein the design server node is a blockchain peer node.

11. The method of claim 8, further comprising determining a usable signal strength area definition within each plane of the plurality of the vertical flight planes.

12. The method of claim 7, further comprising receiving the aerial surveillance data further comprising 3-D sequential signal strength data collected by the UAS passing through a plurality of vertical flight planes located at a standard distance from each other over the target area.

13. A non-transitory computer readable medium comprising instructions, that when read by a processor, cause the processor to perform:
acquiring aerial surveillance data of a target area from an unmanned aircraft system (UAS) flying over the target area;
parsing the aerial surveillance data to derive an at least one feature vector;
providing the at least one feature vector to a machine learning (ML) module residing on the at least one cloud server node for generating a predictive model of a wireless network for the target area;
receiving a plurality of outputs of the predictive model;
generating a wireless network design for the target area based on the plurality of the predictive outputs; and
configuring the ML module to codify deterministic base relationships characterizing known profiles and behaviors of radio frequency (RF) and other electronic elements to be used in the wireless network design for the target area.

14. The non-transitory computer readable medium of claim 13, further comprising instructions, that when read by the processor, cause the processor to receive the aerial surveillance data comprising 3-D mapping data and 3-D sequential signal strength data collected by the UAS passing through a plurality of vertical flight planes located at a standard distance from each other over the target area.

15. The non-transitory computer readable medium of claim 14, further comprising instructions, that when read by the processor, cause the processor to configure the ML module to implement ML regression modeling of a signal strength within each plane of the plurality of the vertical flight planes.

16. The non-transitory computer readable medium of claim 14, further comprising instructions, that when read by the processor, cause the processor to record the 3-D sequential signal strength data onto a blockchain.

17. The non-transitory computer readable medium of claim 14, further comprising instructions, that when read by the processor, cause the processor to determine a usable signal strength area definition within each plane of the plurality of the vertical flight planes.

18. The non-transitory computer readable medium of claim 14, further comprising instructions, that when read by the processor, cause the processor to determine a usable signal strength area definition in a 3-D space based on a smart interpolation provided by the ML module.

\* \* \* \* \*